(12) United States Patent
Hamza et al.

(10) Patent No.: US 11,352,803 B2
(45) Date of Patent: Jun. 7, 2022

(54) SWIMMING POOL FLOWMETER THAT SERVES AS A SAFETY VACUUM RELEASE SYSTEM

(71) Applicant: Vaccare, LLC, Canoga Park, CA (US)

(72) Inventors: Hassan Hamza, Simi Valley, CA (US); Reza Afshar, Westlake Village, CA (US)

(*) Notice: Subject to any disclaimer, the term of this patent is extended or adjusted under 35 U.S.C. 154(b) by 492 days.

(21) Appl. No.: 14/269,147

(22) Filed: May 4, 2014

(65) Prior Publication Data

US 2015/0315803 A1 Nov. 5, 2015

(51) Int. Cl.
*E04H 4/12* (2006.01)
*E04H 4/14* (2006.01)
*G01F 15/18* (2006.01)
*G01F 1/115* (2006.01)

(52) U.S. Cl.
CPC ............... *E04H 4/12* (2013.01); *E04H 4/14* (2013.01); *G01F 1/115* (2013.01); *G01F 15/185* (2013.01)

(58) Field of Classification Search
CPC ..................................... E04H 4/12; E04H 4/14
USPC ......................................................... 73/861.79
See application file for complete search history.

(56) References Cited

U.S. PATENT DOCUMENTS

| 3,878,718 | A | 4/1975 | Sugiyama | |
|---|---|---|---|---|
| 6,668,858 | B1* | 12/2003 | Bazargan | F16K 15/033 137/269.5 |
| 7,650,801 | B2* | 1/2010 | Kuhlemann | G01F 1/115 73/861.79 |
| 8,128,058 | B2* | 3/2012 | Quinn | F16K 1/2028 251/83 |
| 2012/0073040 | A1* | 3/2012 | Cohen | E04H 4/1272 4/504 |
| 2012/0090406 | A1 | 4/2012 | Etter | |
| 2015/0224525 | A1* | 8/2015 | Klicpera | G01F 15/075 4/615 |
| 2015/0241254 | A1* | 8/2015 | DeVita | G01P 13/004 73/861.79 |

* cited by examiner

*Primary Examiner* — Christine J Skubinna
(74) *Attorney, Agent, or Firm* — Louis F. Teran (57) ABSTRACT

The flowmeter of the present invention is primarily used in swimming pools and is configured to deactivate a swimming pool pump when the drain in the swimming pool is blocked or covered. Swimming pool drains are often blocked or covered by the body of a swimmer. When the drain is blocked or covered, the pump creates substantial suction force that entraps the body of a swimmer against the drain. By deactivating the pump when the drain is blocked or covered, the flowmeter of the present invention serves as a safety vacuum release system that prevents entrapment of a person by the drain of the swimming pool.

8 Claims, 13 Drawing Sheets

SWIMMING POOL FLOWMETER THAT SERVES AS A SAFETY VACUUM RELEASE SYSTEM

BACKGROUND OF INVENTION

Field of Invention

The present invention is related to an apparatus and method of measuring the flow rate of water extracted from a swimming pool and utilizing said measurement to control a swimming pool pump so as to prevent the entrapment of a person by the drain of the swimming pool and to optimize the use of the pump so that the swimming pool is maintained clean without wasting energy.

Description of Prior Art

A swimming pool or simply a pool is a container filled with water intended for swimming or water-based recreation. A swimming pool can be built of various sizes and either above or in the ground. A swimming pool may be for public or private use. Private swimming pools are mostly built in private residences and used for recreation and relaxation by adults, children, and even infants. Public pools are mostly built in hotels, schools, fitness centers, and parks. Public pools are mostly used for fitness, water sports, and training by people of all ages, including elderly and young children.

Swimming pools present a significant risk of death and drowning, especially for young children and the elderly. In regions where private pools are common, drowning is typically a major cause of childhood fatalities. As a result, the design, construction, and maintenance of pools are fields that are highly regulated by federal, state, and local governments.

Swimming pools are designed to be large containers of water with a drain, inlet connections, and a circulation system. The circulation system is driven by a large water pump that extracts water from the pool through the drain. The water that is extracted from the pool is passed through as debris collection trap and a skimmer to remove large debris such as leaves and branches. The water is then pumped back into the swimming pool through the inlet connections that are typically located around the interior wall of the pool.

The drain in a swimming pool creates a significant suction caused by large volume of water being extracted from the pool through the drain by the pump. The suction can be strong enough to trap a person on the drain. When a person inadvertently places parts of their body in the vicinity of an active drain, a portion of their body may become entrapped by the chain. A drain that is completely blocked can develop a strong vacuum within a fraction of a second with suction pressure that may prevent a person entrapped by the drain to be able to break free, thus, leading to death by drowning.

A drain in a large swimming pool is generally located at the bottom of the deepest section, may be 6 to 10 feet below the water surface. In smaller pools or spas, the drain is also positioned at the lowest point which may be only a few feet from the surface. Thus in the use of a smaller pool or spa, there is a considerably greater likelihood that the user will come into contact with the drain.

The drains in residential swimming pools are typically small in diameter. The pumps used in pools are typically large horsepower pumps that can draw a vacuum as high as 29 inches of mercury. Thus it is possible that the body of a person, when positioned in close proximity to the drain, may be drawn down upon the surface of the drain cover to completely block the drain openings thus creating a strong vacuum that can entrap and drown a person in a few seconds. The suction pressure of this magnitude can prevent young people and some adults from pulling free from the suction of a drain that is completely blocked by the body or clothing of such person. Even if the person is able to pull free, bruises or welts may result. In at least one case, a child was drowned when his abdomen inadvertently covered and blocked the drain, whereby he was entrapped at the bottom of the pool and unable to break free.

Body entrapment typically occurs when a part of a person's torso completely covers a drain. A limb entrapment refers to accidents in which a person's arm or leg is sucked into the drain of a pool. Disembowelment accidents occur where small children place their buttocks over a drain, completely covering the drain creating a seal. Injury occurs when the greatly increased suction acts to eviscerate the child when their lower intestines are sucked out of their body through their anus.

Safety organizations, such as the United States Consumer Product Safety Commission (CPSC), the National Spa and Pool Institute (NPSI), and various governments have acknowledged the need for vacuum release systems that protect against swimming pool or spa drain entrapment. In fact, in 2008, the Federal Pool and Safety Act became effective and addresses this problem of body entrapment by swimming pool drains.

To address this issue of body entrapment, suction entrapment avoidance fixtures have been developed that can be installed within the pipe of the circulation system to minimize the risk of suction entrapment injury. These suction entrapment avoidance fixtures can be very effective at releasing the suction developed under dangerous circumstances. However, all of said suction entrapment avoidance fixtures are designed to activate after suction has developed. In essence, the devices in the market are designed to eliminate any suction already developed by the entrapment of a swimmer. The inventor of the present invention is unable to identify prior art specifically designed to prevent any suction from developing.

What is needed is a reliable and robust device that continuously monitors the specific parameters that can cause or exacerbate the development of dangerous suction force at the drain of a swimming pool. For example, the faster that water is extracted from the pool the greater the risk of a suction being developed. Thus, unless a safe, inexpensive, and easy method of preventing the development of dangerous suction at the drain of a swimming pool is created, the risk of people continuing to be injured or drown by entrapment at the drain of a swimming pool will persist.

SUMMARY OF THE INVENTION

Accordingly, the present invention has been made in view of the above-mentioned disadvantages occurring in the prior art. The present invention is a swimming pool flowmeter with a rotor that rotates at a velocity that is proportional to the flow rate of water within the swimming pool drain pipe. The flow rate of the water in the drain pipe is then used to determine if the swimming pool pump must be shut-off so as to prevent and eliminate any entrapment of a body by the drain in the swimming pool.

It is therefore a primary object of the present invention to detect the flow rate of the water within the drain pipe of a swimming pool.

Another object of the present invention is to maintain the flow rate of the water within the drain pipe of a swimming pool within a predetermined range so as to prevent a vacuum or suction force at the drain with sufficient power to entrap a person underwater.

Yet another object of the present invention is to provide a cessation of a suction force at the drain of a swimming pool immediately upon the drain becoming blocked or substantially covered.

A yet further object of the present invention is to prevent the operation of the swimming pool pump when the flow rate within the drain pipe is below a predetermined range.

Another object of the present invention is to maximize the efficiency of the water recirculation by keeping all the pipes fully filled with water even when the pump is turned off by means of the check valve function.

Another object of the present invention is to monitor the water flow thru a see-through sight glass.

The above objects and other features and advantages of the present invention, as well as the structure and operation of various embodiments of the present invention, are described in detail with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Reference will now be made to the drawings in which various elements of the present invention will be given numerical designations and in which the invention will be discussed so as to enable one skilled in the an to make and use the present invention.

Figure 1:
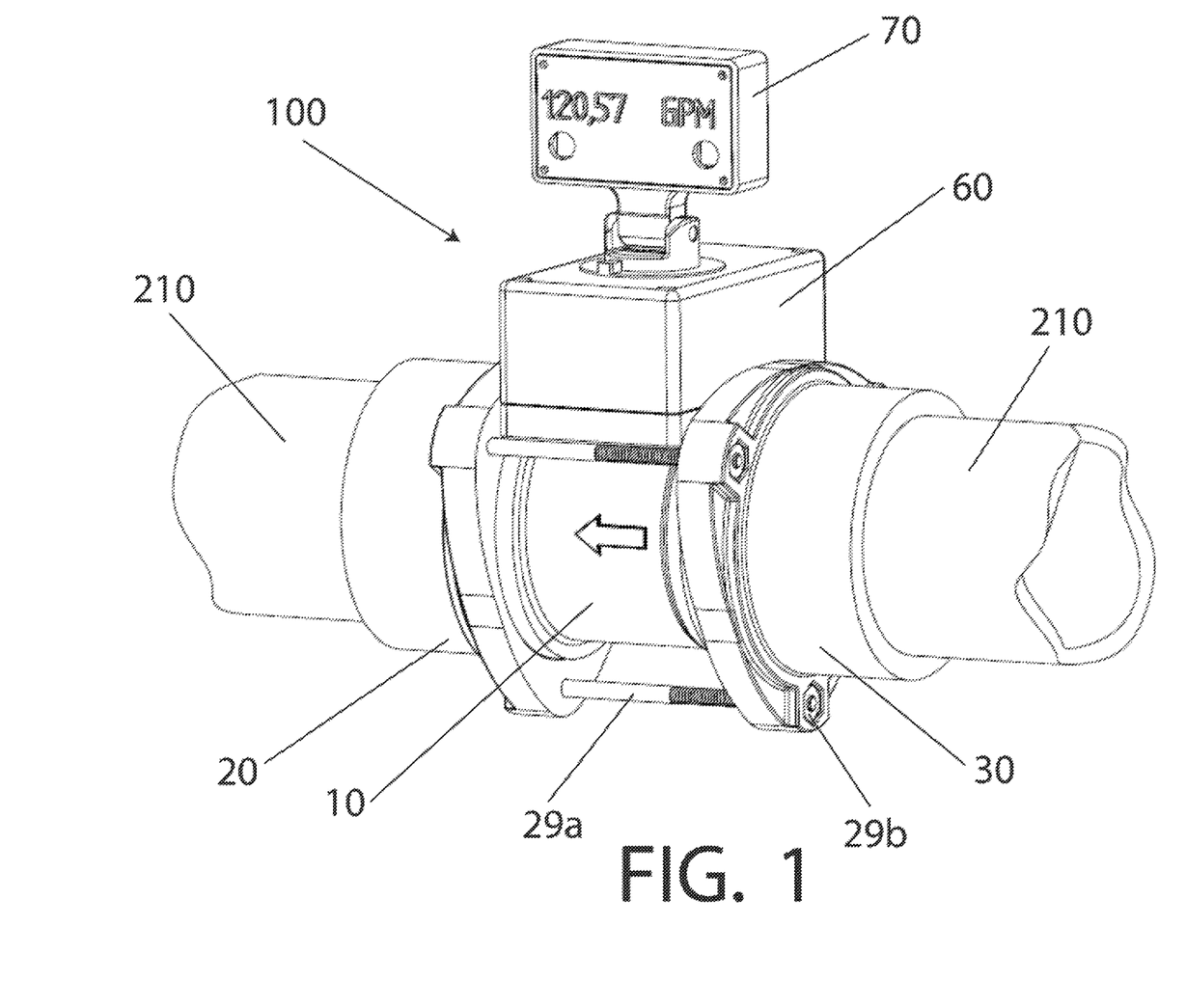
FIG. 1 is a perspective view of the pool flowmeter of the present invention in its assembled state as it would be installed to the drain pipe of a swimming pool.

FIG. 1 illustrates the functional elements that can be variously combined, to form different combinations that embody the present invention. The present invention comprises a pool flowmeter 100 with a casing 10, a front attachment 20, a back attachment 30, a rotor 40, a flow protector 50, a control box 60, and a display unit 70.

Figure 3A:
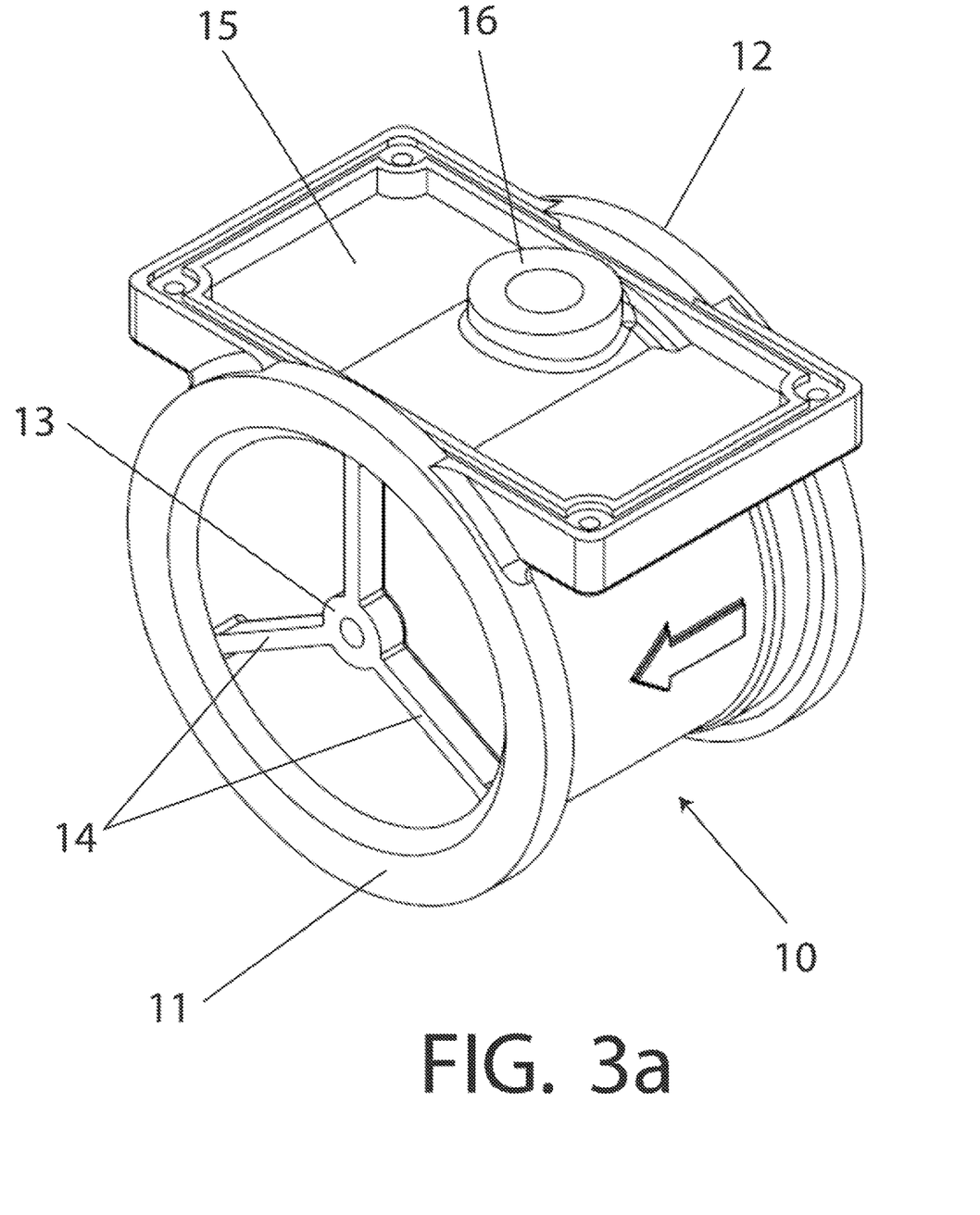
FIGS. 3a and 3b show perspective views of the easing of the present invention.
Figure 3B:
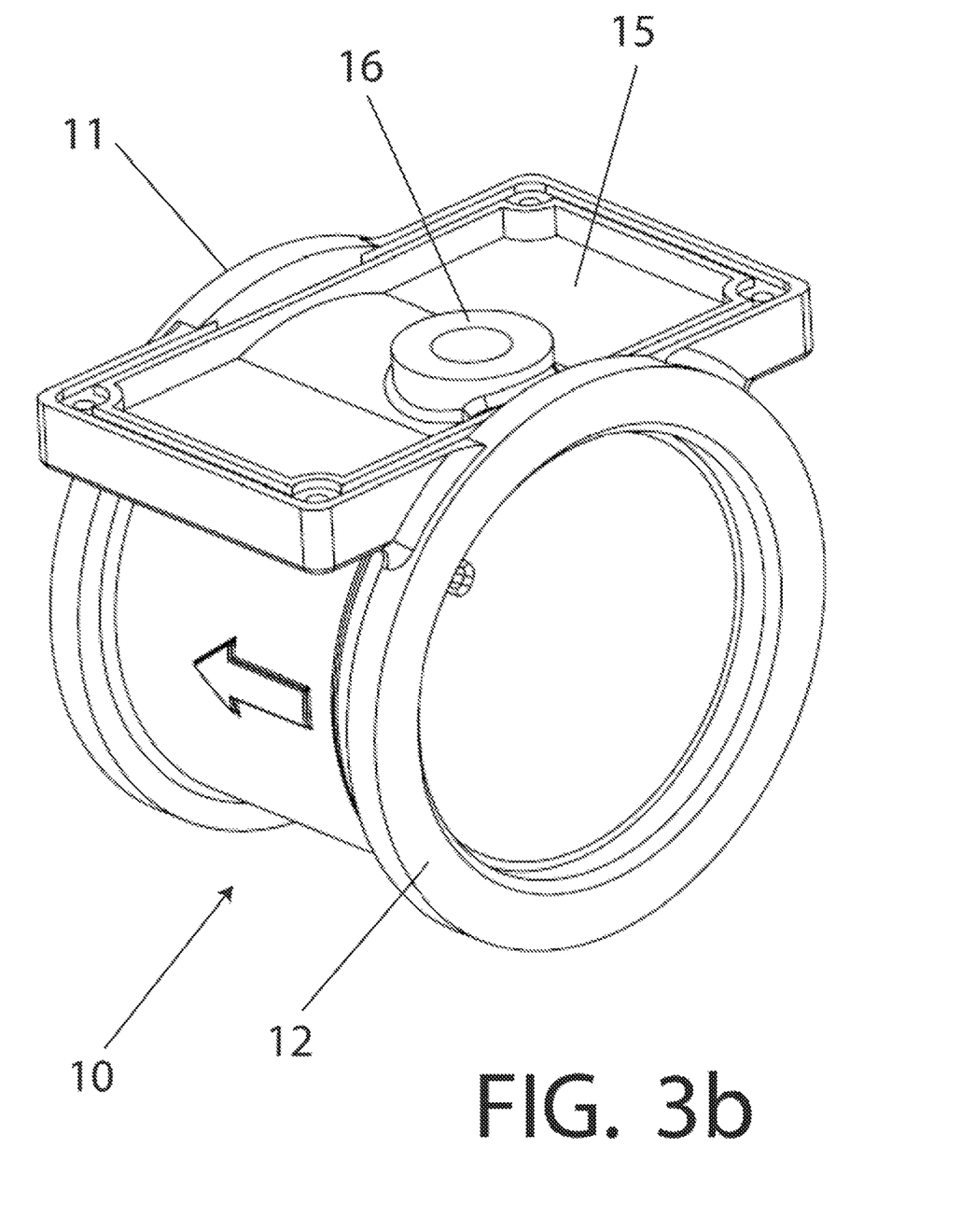

The casing 10 is cylindrical in shape having a front flange 11 and a back flange 12. A ring 13 is centrally located within the casing 10 and held in place by a plurality of supports 14 that form an attachment between the casing 10 and the ring 13 as shown in FIGS. 3a and 3b. Additionally, the top of the casing 10 has a platform 15 with a protrusion 16 as shown in FIGS. 3a and 3b, and to which the control box 60 is attached.

Figure 4A:
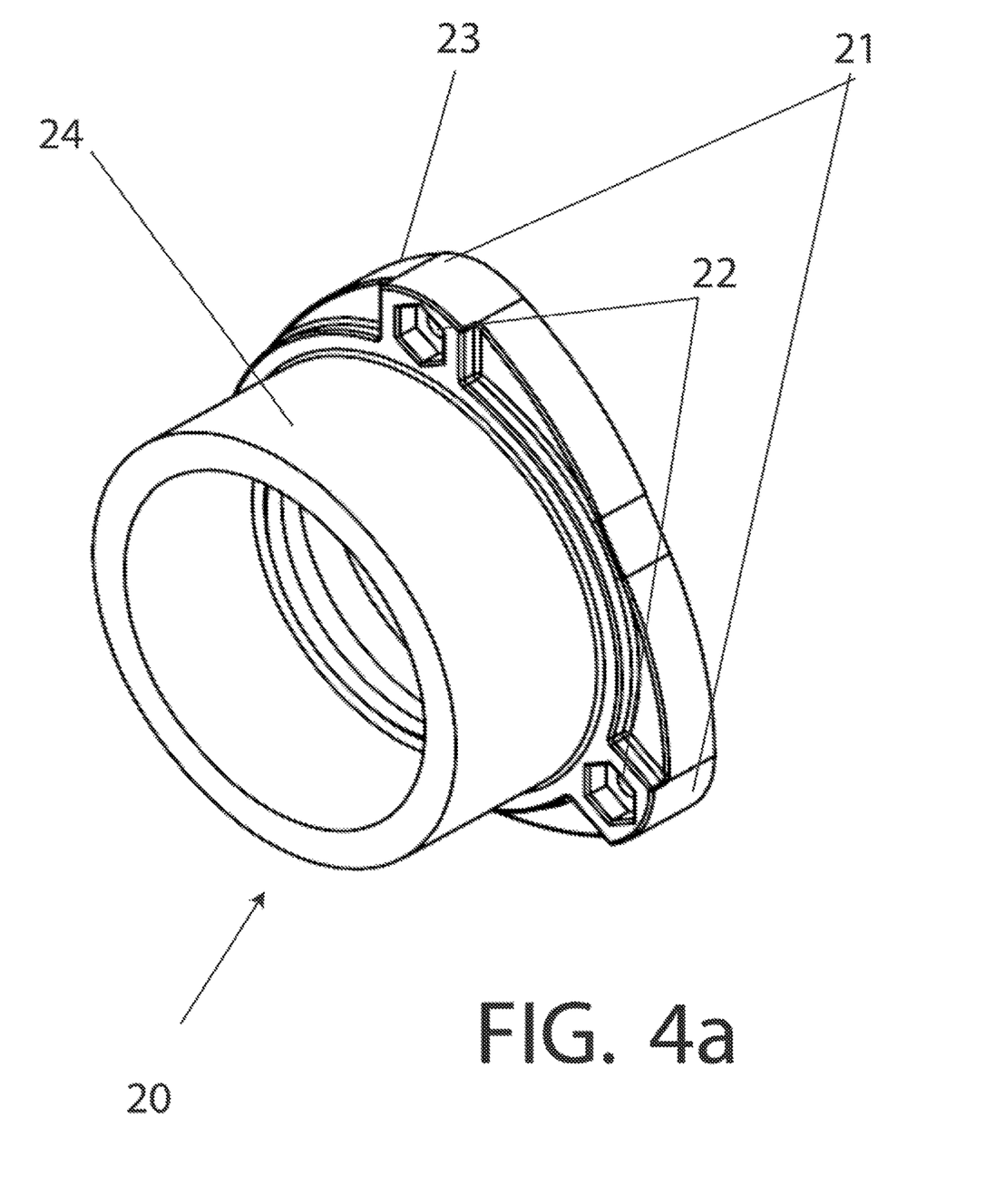
FIGS. 4a and 4b show perspective views of the front attachment of the present invention.
Figure 4B:
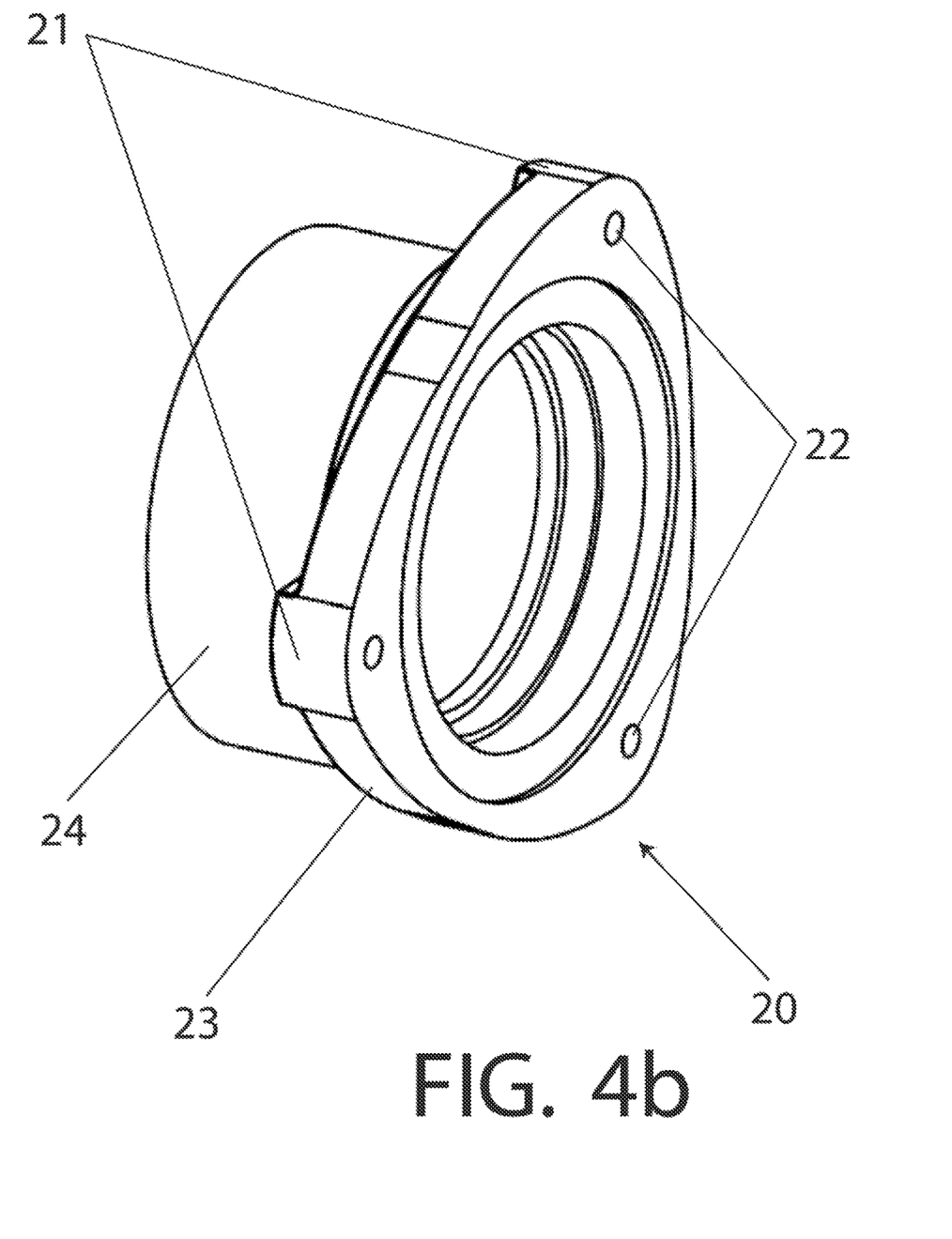
Figure 5A:
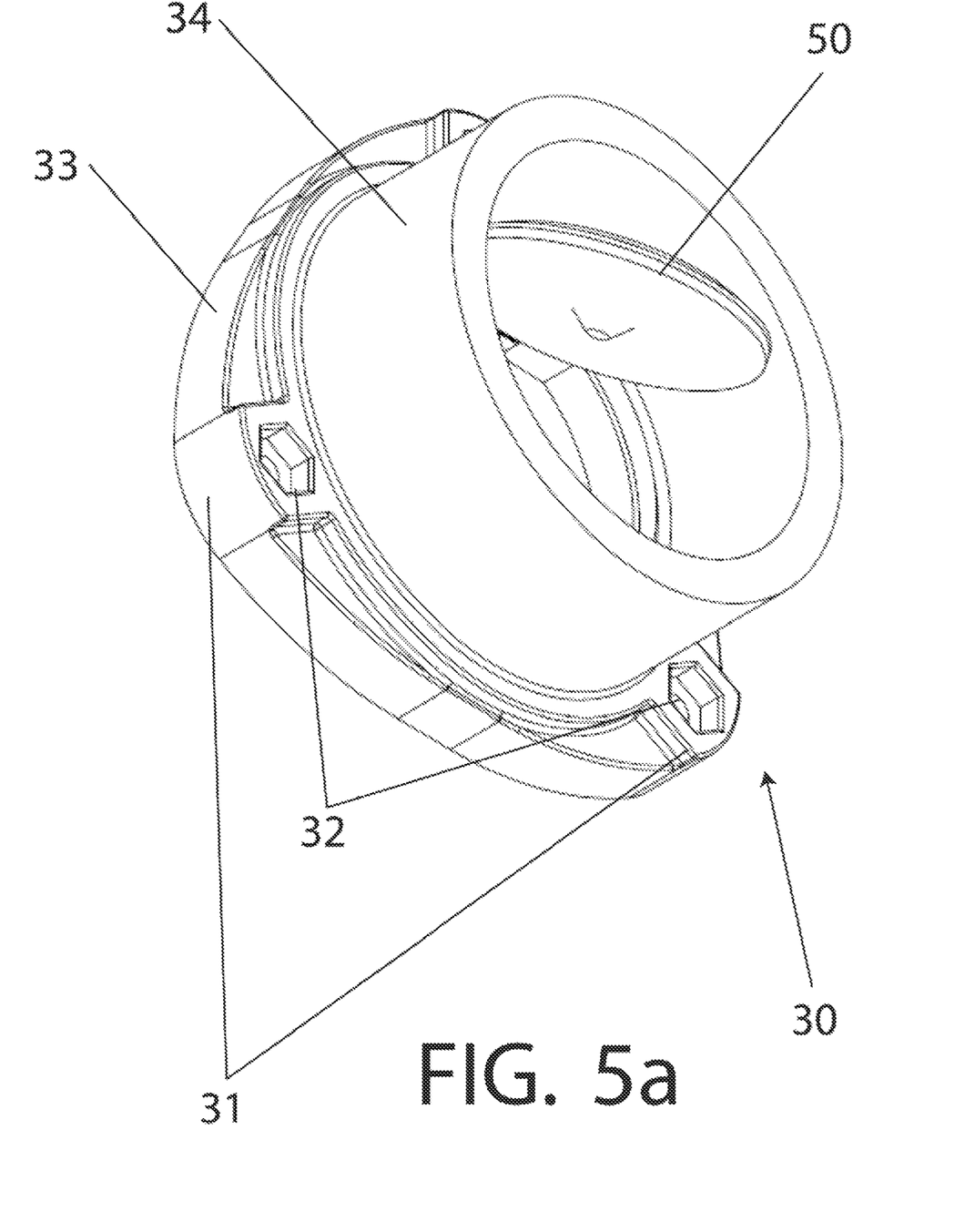
FIGS. 5a and 5b show perspective views of the back attachment of the present invention.
Figure 5B:
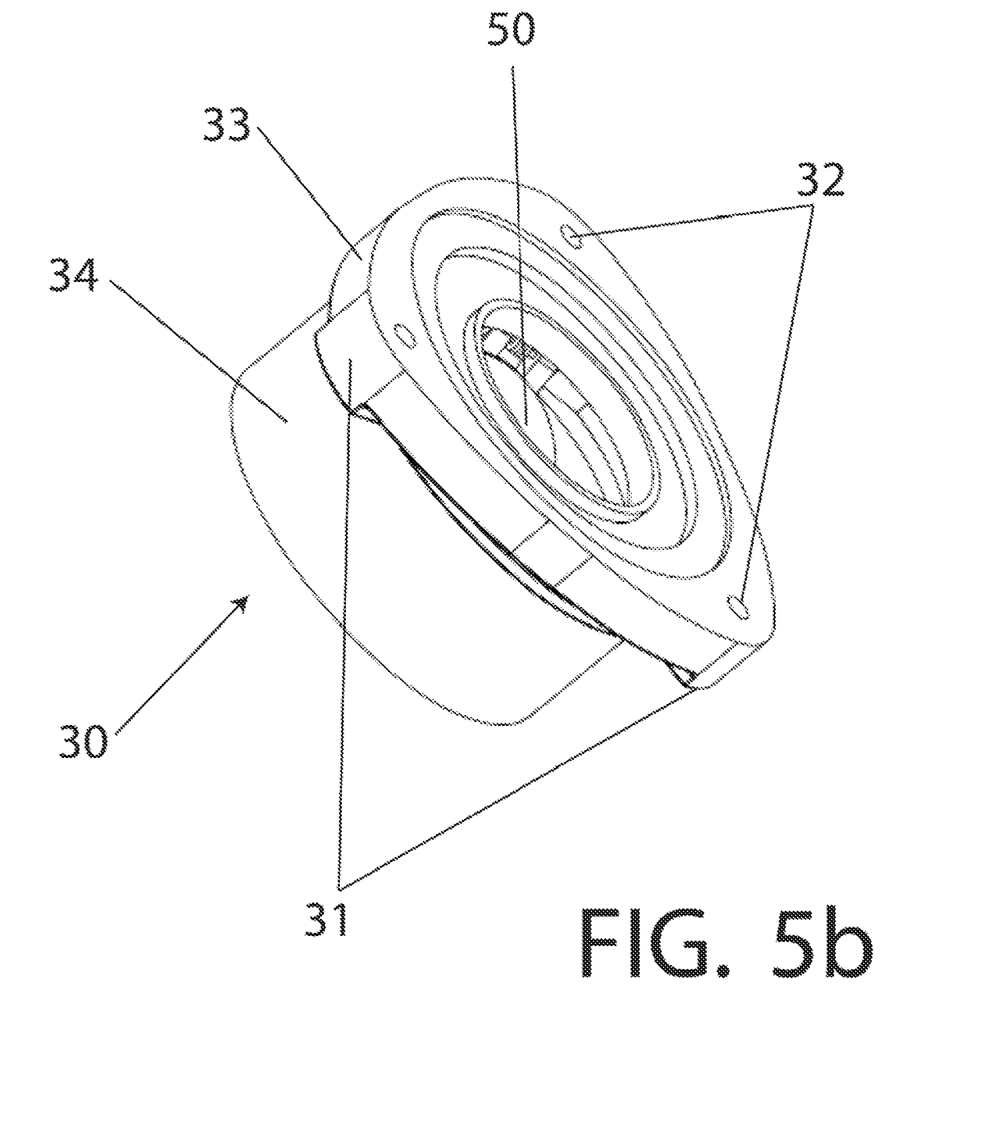

The front attachment 20 is annular in shape having a plurality of prongs 21 that protrude radially outward as shown FIGS. 4a and 4b. Each prong 21 is adjacent to the first end 23 of the front attachment 20 and has a hole 22, as shown in FIGS. 4a and 4b. The back attachment 30 mirrors the front attachment 20 in size and shape. Thus, the back attachment 30 is also annular in shape having a plurality of prongs 31 that protrude radially outward as shown in FIGS. 5a and 5b. Each prong 31 is adjacent to the first end to the first end 33 of the back attachment and has a hole 32, as shown in FIGS. 4a and 4b. However, the front attachment 20 differs from the back attachment 30 in that it has a flow protector 50 inserted through the first end 23 as shown in FIGS. 4a and 5a.

Figure 6A:
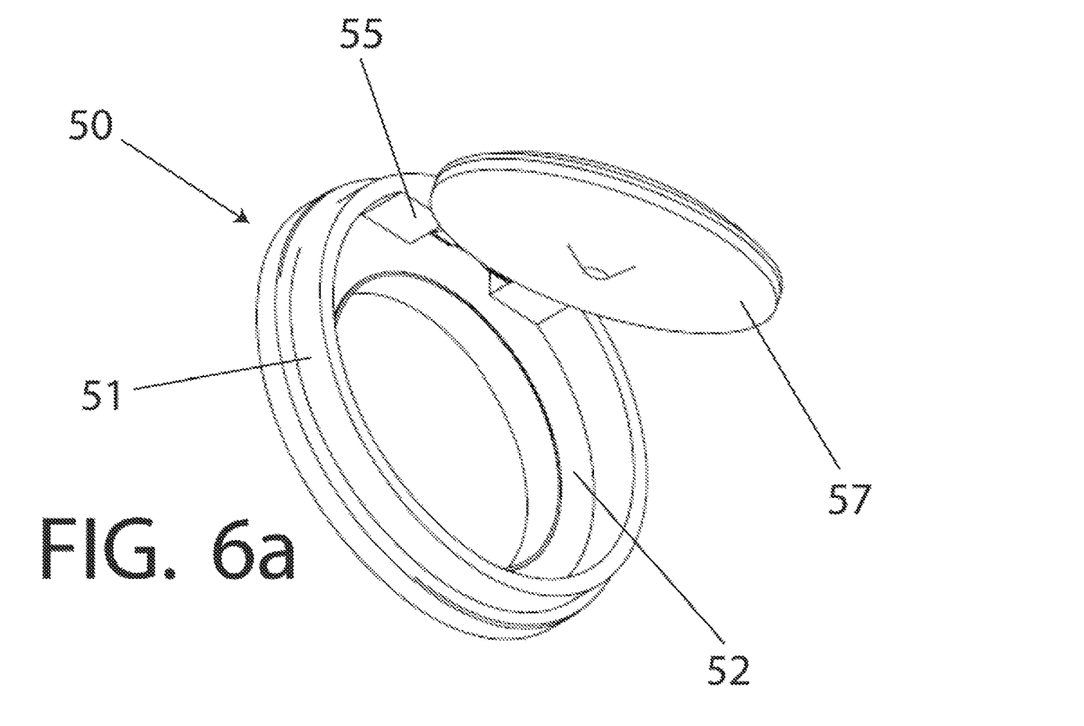
FIGS. 6a and 6b show perspective views of the flapper of the present invention.
Figure 6B:
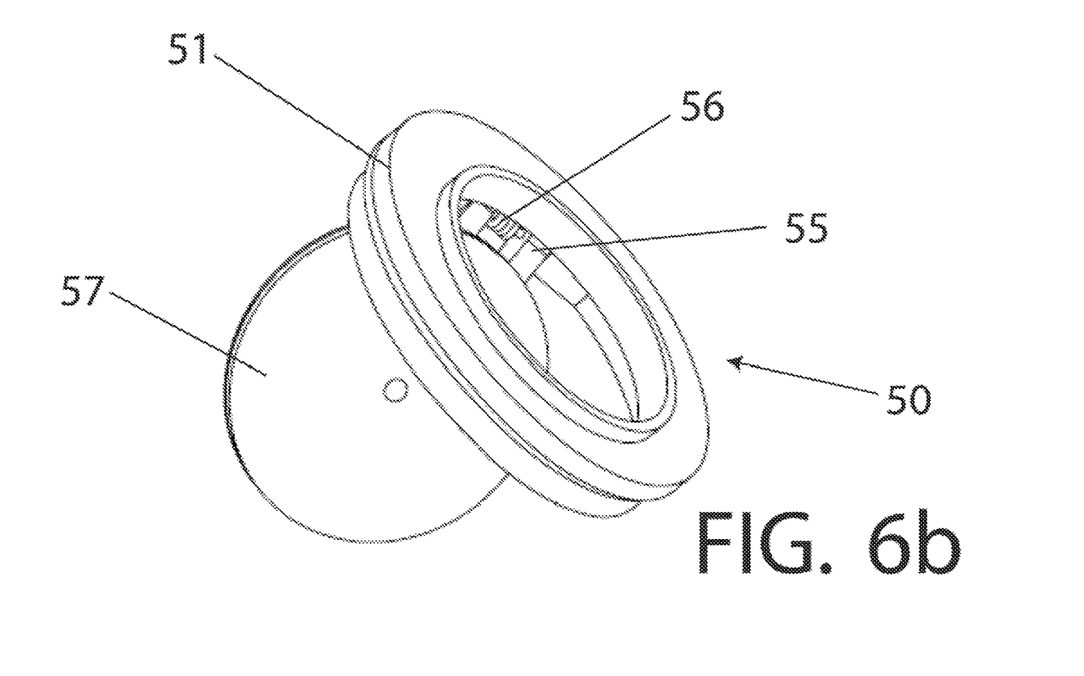

The flow protector 50 has a predominantly flat disc 57 with a hinge 55 attached to a frame 51 that forms a seal seat 52. It is preferred that the hinge 55 be located at the top portion of the flat disc 57 so that the bottom portion can swing, as shown in FIGS. 6a and 6b. The flow protector 50 is configured with a flat disc 57 that swings on the hinge 55 off the seal seat 52 to allow forward flow of water. However, when the flow of the water ceases or reverses direction, the flat disc 57 swings back on to the seal seat 52 so as to block the reverse flow of water.

Figure 7:
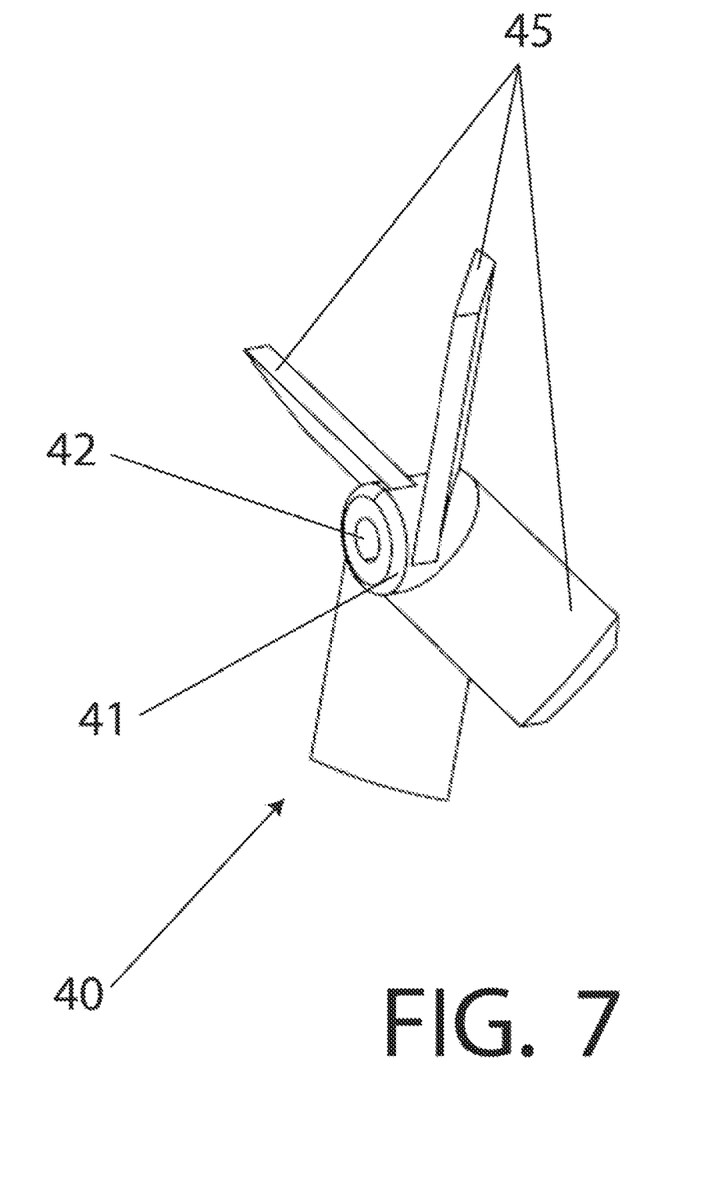
FIG. 7 shows a perspective view of the rotor of the present invention.

In the preferred embodiment, the rotor 40 comprises a hub 41 with a shaft 42 that is coaxially extending outward from opposite sides of the hub 41. In addition, a plurality of blades 45 are embeddedly fixed to the hub 41, as shown in FIG. 7. It is preferred that the blades 45 be made out of plastic material with a piece of magnetic material embedded therein. Otherwise, the blades 45 can be made purely out of magnetic material.

Figure 9:
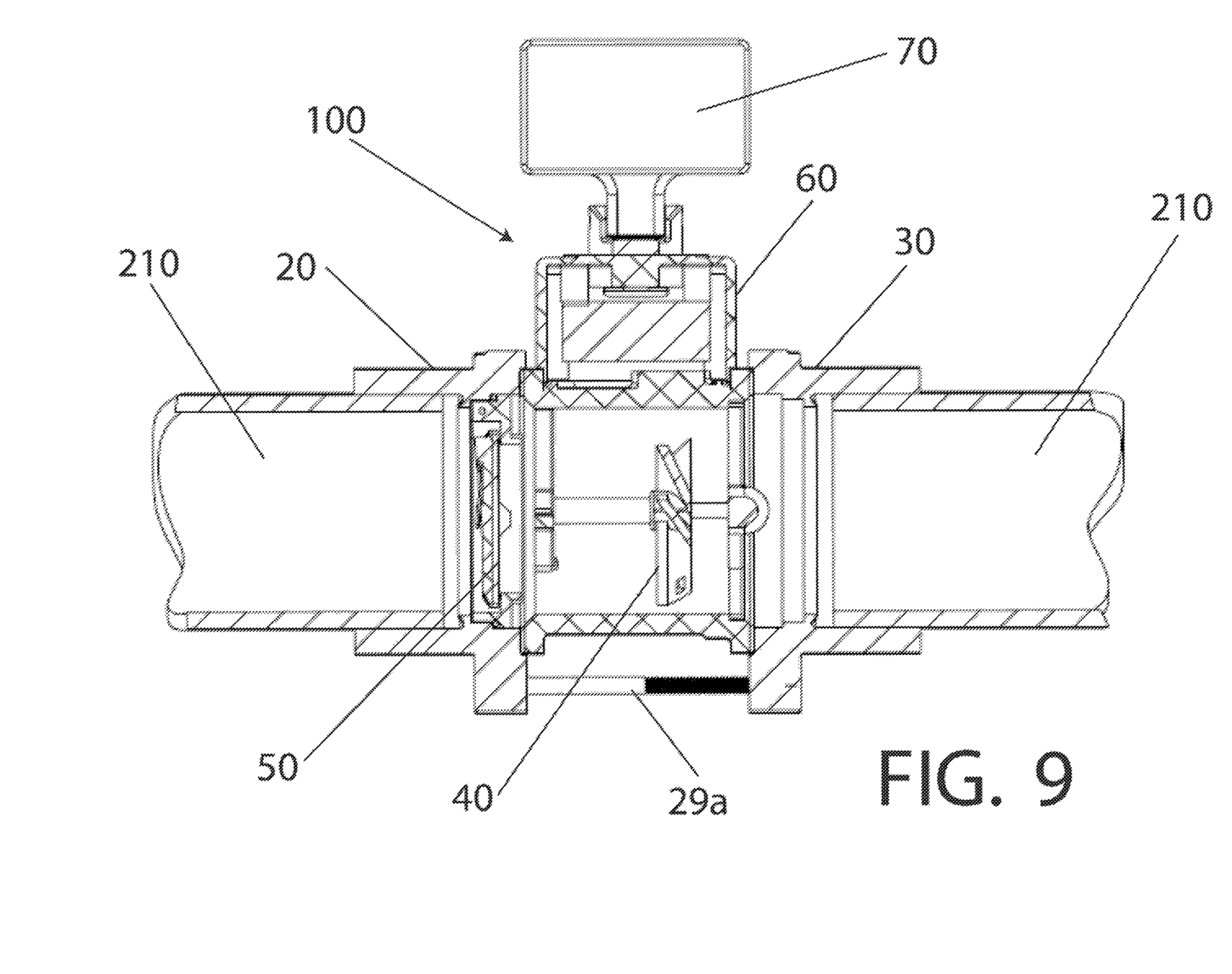
FIG. 9 is a cross sectional view of the pool flowmeter of the present invention installed to the drain pipe of a swimming pool.

The pool flowmeter 100 of the present invention is configured for installation to a drain pipe 210 of a swimming pool 200. The drain pipe 210 extends from a drain 230 to a pump 240 and back to the swimming pool 200. The pool flowmeter 100 of the present invention is installed to the drain pipe 210 so that it may measure the flow of water being drawn by the pump 240 from the swimming pool 200. Installation of the pool flowmeter 100 of the present invention is as follows: First, the drain pipe 210 is split, or cut at the desired location for the pool flowmeter 100. Second, the front attachment 20 and the back attachment 30 are each attached with an adhesive to each cut end of the drain pipe 210 as shown in FIG. 9. Third, the shaft 42 of the rotor 40 is fitted into the ring 13 so that the rotor 40 is thereby free to rotate or to be displaced within the casing 10. It is preferred that a bearing be used to facilitate rotation. With the rotor 40 in place, the casing 10 is placed in between the front attachment 20 and the back attachment 30 that are attached to the drain pipe 210. Placement of the casing 10 is such that the front flange 11 abuts the front attachment 20 and the back flange 12 abuts the back attachment 30 as shown in FIGS. 1 and 9. Finally, a plurality of long bolts 29a are inserted through the holes 22 in the front attachment 20 and then through the holes 32 in the back attachment 30. A nut 29b is then attached to each long bolt 29a so that the front attachment 20, the back attachment 30, and the casing 10 are held securely together as shown in FIGS. 1 and 9. The preferred embodiment of the present invention incorporates a rubber o-ring or gasket 99 between the front flange 11 and the front attachment 20 and between the back flange 12 and the back attachment 30. The rubber o-ring or gasket creates a seal so as to prevent any water from leaking out of the drain pipe 210 or the pool flowmeter 100 of the present invention.

Once the casing 10, front attachment 20, and back attachment 30 are properly installed to the drain pipe 210 of a swimming pool 200, the pump 240 of the swimming pool 200 is activated to extract water from the swimming, pool 200 through the drain pipe 210. Forces created by the water flowing through the drain pipe 210 cause the rotor 40 to rotate or to be displaced within the casing 10 and cause the flat disc 57 of the flow protector 50 to swing on the hinge 55 off the seal seat 52 to allow forward flow of the water.

In essence, the water flowing within the drain pipe 210 from the drain 230 is intercepted by the blades 45 thus promoting the rotation or displacement of the rotor 40. The rate of rotation or displacement of the rotor 40 will be proportional to the flow rate of water in the drain pipe 210. Thus, the greater the flow rate of the water in the drain pipe 210 the faster the rotor 40 rotates or displaces.

A hall sensor 17 is placed inside the protrusion 16 in the platform 15 of the casing 10 as shown in FIG. 9. When the rotor 40 is properly positioned in the casing 10 as shown in FIG. 9, the hall sensor 17 is directly above the blades 45 of the rotor 40. Thus, the hail sensor 17 is able to sense the magnetic properties of the rotor 40 as it rotates or displaces directly underneath the hall sensor 17. As the rotor 40 is rotated or displaced by the water flow within the drain pipe 210, the hall sensor 17 detects the rate at which the rotor 40 is rotated or displaced. The hall sensor 17 then converts the rate of rotation or displacement of the rotor 40 into a corresponding signal 91 having a frequency corresponding to the rate of rotation or of the rotor 40. The rate of rotation or displacement of the rotor 40 is correlated to the flow rate of the water in the drain pipe 210 and communicated to a display unit 70 via cables.

However, the rotor 40 only rotates or displaces when water flows within the drain pipe 210. Water flows within the drain pipe 210 only when the pump 240 is activated to extract water from the swimming pool 200 through the drain 230. Furthermore, the flow protector 50 has a spring 56 that pushes the flat disc 57 against the seal seat 52. When the pump 240 is turned on, it has to be set with sufficient power output to create a minimum flow rate of water within the drain pipe 210 that overcomes the resistive force of the spring 56 so that the flat disc 57 swings on the hinge 55 and off the seal seat 52 to allow water to flow through. This ensures that any water flow within the drain pipe 210 exceeds a predetermined rate as set by the resistive force of the spring 56. The flow protector 50 also ensures that water in the drain pipe 210 will not flow in the reverse direction.

It is important that the water flow in the drain pipe 210 exceed the predetermined rate in the forward direction so as to preserve the accuracy and operating life of the pump 240 and of the pool flowmeter 100 of the present invention.

Allowing the pump 240 or the pool flowmeter 100 to operate with low water flow can result in excessive wear and heat that cause damage. The damage is caused when the rotor 40 or the impeller in the pump 240 churn low volumes of water. This can increase the temperature of the water due to friction to the point that it flashes into vapor. The vapor can then interrupt the cooling of the pump 240 and pool flowmeter 100 causing excessive wear and heat.

The flow rate of the water in the drain pipe 210 can drop outside the operating range when the drain 230 is blocked or covered. When this occurs, the blockage of the drain 230 limits or prevents the amount of water from the swimming pool from entering the drain pipe 210 resulting in a low water flow rate. But a dangerous situation arises when the drain 230 is blocked or covered by the body of a swimmer. Such results in the dangerous body entrapment issues previously discussed. When the body of a swimmer blocks or covers the drain 230, a substantial suction force is created by the pump 240 as it tries to extract water from the swimming pool 200. The suction force can often be great enough that the swimmer is unable to break free without injury or even death. Despite the source of the blockage, the pool flowmeter 100 of the present invention can detect such a potential danger by sensing the sudden drop in flow rate of the water in the drain pipe 210 while the pump 240 is running. When the flow rate drops below the acceptable operating levels, the pool flowmeter 100 of the present invention sends a corresponding signal to the display unit 70 and/or to the pump 240.

The pool flowmeter 100 of the present invention is configured with means of communicating with the pump 240. The communication can be accomplished directly through a wire that is connected between the pool flowmeter 100 and the pump 240. The communication can also be accomplished through a wireless communication such as Bluetooth, wifi, or a network between a first communication device 85 located within the pool flowmeter 100 and a second communication device 86 connected to the pump 240. The pump 240 shuts off or deactivates immediately upon receiving said signal from the pool flowmeter 100 when the flow rate of the water in the drain pipe 210 is below a predetermined rate. Thus, when the flow rate of the water in the drain pipe 210 is below a predetermined rate, the pool flowmeter 100 sends a signal to the pump 240 to deactivate or shut off.

The communication between the pool flowmeter 100 and the pump 240 takes place through a number of steps and components each of which are discussed below. The hall sensor 17 collects information of the rate of rotation or displacement of the rotor 40. The hall sensor 17 then transmits a signal 91 to a data manager 82 located within the pool flowmeter 100. The signal 91 correlates to the current rate of rotation or displacement of the rotor 40. The data manager 82 is configured to receive said signal 91, to convert it to the corresponding flow rate of the water in the drain pipe 210, and to monitor the flow rate over time by processing multiple signals 91. The data manager 82 can be implemented in software, hardware, or a combination thereof. In the preferred embodiment, the data manager 82 is implemented in software and stored in computer memory within the pool flowmeter 100.

The data manager 82 is preferably configured to maintain a database 82a of flow rate data which includes the flow rate information as well as any other desirable information. For example, the data manager can be configured to include the flow rate at particular times, the length of time that water has been flowing through the drain pipe 210 continuously, and/or the average flow rate over a particular time period. The data stored in the data manager 82 may include other desirable information not mentioned, herein without departing from the principles of the present invention.

Figure 10:
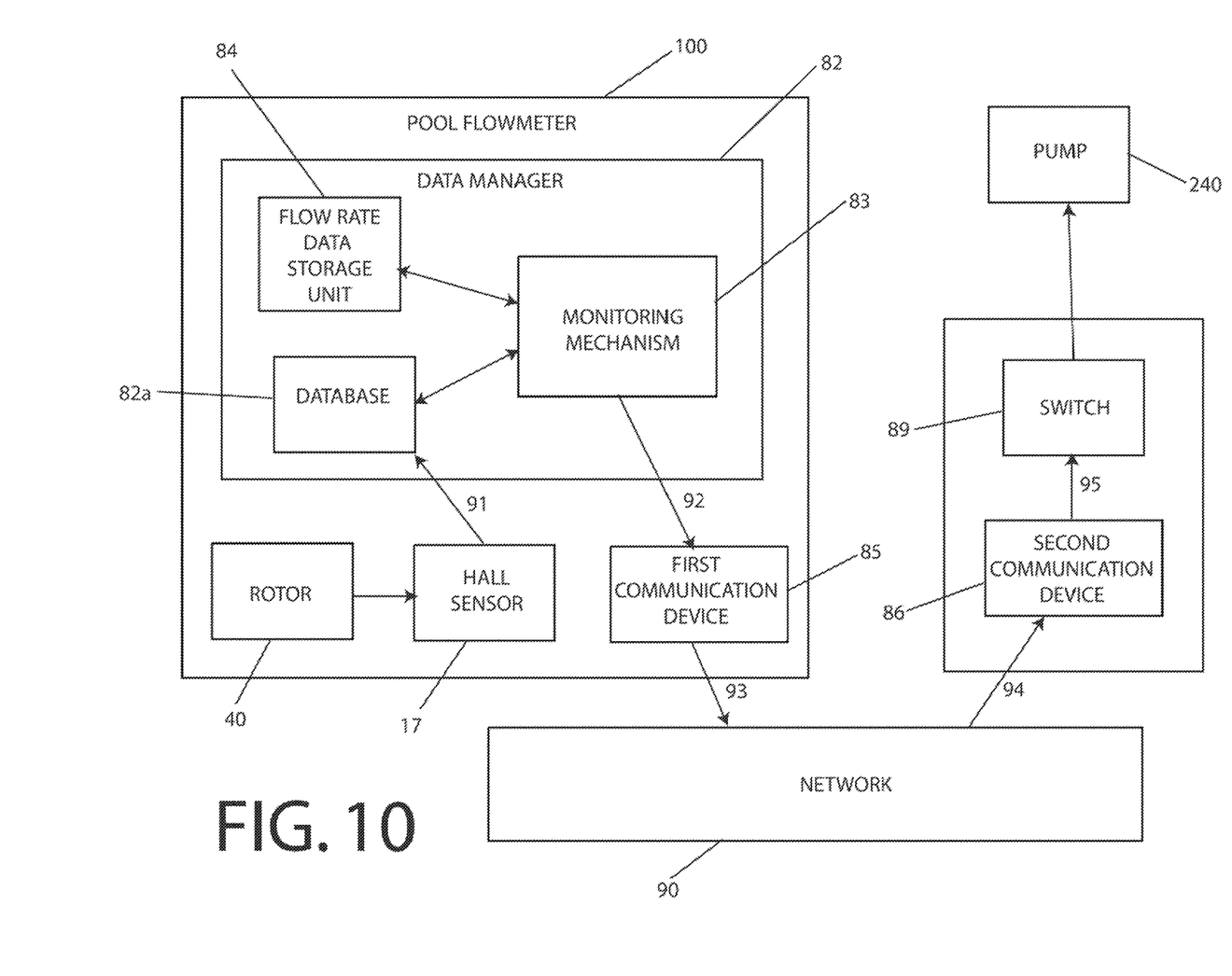
FIG. 10 is a block diagram illustrating the pool flowmeter of the present invention.
Figure 11:
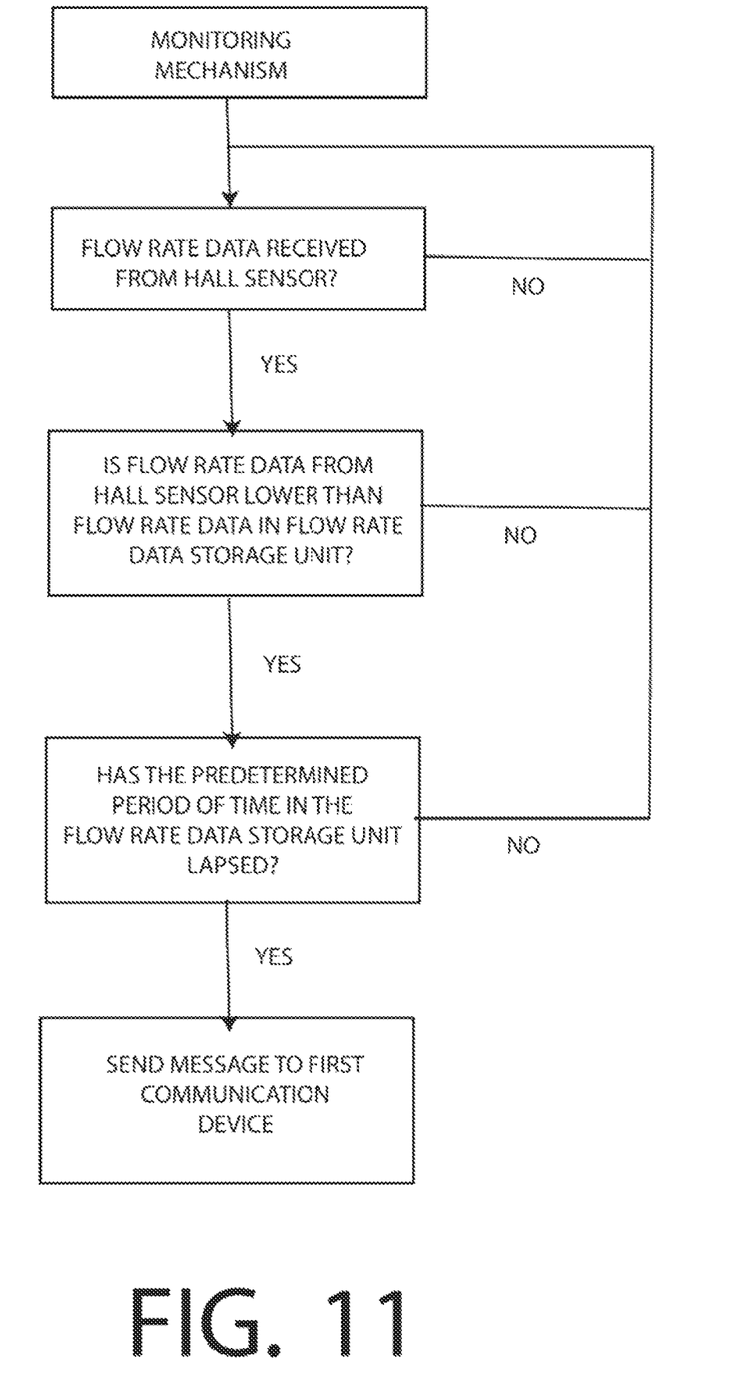
FIG. 11 is a flowchart illustrating the functionality of the monitoring mechanism.

Referring to FIG. 10, the data manager 82 is configured to include a monitoring mechanism 83. The functionality of the monitoring mechanism 83 is depicted in FIG. 11. As shown by blocks in the flowchart of FIG. 11, the monitoring mechanism 83 is configured to receive data from the hall sensor 17, to convert it to flow rate data, and to compare the data with predefined preference data stored in a flow rate data storage unit 84. Preference data, as used herein, is data that defines the preferred parameters indicating when to deactivate or shut-off the pump 240.

Once the monitoring mechanism 83 determines that the pump 240 needs to be deactivated or shut-off, the data manager 82 is designed to communicate a message to the pump 240 via a network and communication devices 85 and 86. The data manager 82 is designed to transmit the message as signal 92 to the first communication device 85 which communicates the message with a network 90 via signal 93. The network 90 then communicates the message to the second communications device 86 via signal 94. The second communication device 86 then communicates the message to a switch 89 via signal 95. The switch 89 is configured to deactivate or shut-off the power to the pump 240 upon receiving signal 95.

Although the preferred embodiment utilizes a network 90 to communicate a notification message to the switch 89, one ordinarily skilled in the art should realize that other configurations are possible. For example, various types of networks can be utilized or utilization of networks can be completely circumvented by configuring the first communication device 85 to communicate directly with the second communication device 86 through a wire or other wireless means. Any embodiment capable of communicating data between the data manager 82 and the switch 89 should be suitable for implementing the principles of the present invention.

The determination by the monitoring mechanism 83 that the pump 240 needs to be deactivated or shut-off takes place through a number of steps each of which are discussed below. The monitoring mechanism 83 makes a determination that a potential blockage of the drain 230 may have occurred when the water flow rate in the drain pipe 210 drops below a predetermined rate. In essence, if the rate of rotation or displacement of the rotor 40 drops below a predetermined value, then the monitoring mechanism determines that a blockage of the drain 230 may have occurred. However, rather than sending the message to deactivate or shut-off the pump 240 immediately, it waits and continuously measures the water flow rate or the rate of displacement of the rotor for a first predetermined period of time. In the preferred embodiment, said first predetermined, period of time is half of one second. Thus, for half of one second after the water flow rate drops below a predetermined rate, the monitoring mechanism 83 receives and analyzes the data from the hall sensor 17 continuously. If the water flow rate remains below the predetermined rate for the entirety of the first predetermined period of time, then the monitoring mechanism 83 determines that the pump 240 must be deactivated or shut-off.

Once the monitoring mechanism 83 determines that the pump 240 needs to be deactivated or shut-off, the switch 89 deactivates or shuts-off the power to the pump 240 by disconnecting the power source to the pump 240. The switch 89 is then left in the deactivated position for a second predetermined period of time. In the preferred embodiment of the present invention, the second predetermined period of time is three minutes. Thus, when the monitoring mechanism 83 determines that the pump 240 must be deactivated or shut-off, the switch 89 is deactivated and is configured to remain deactivated for a period of three minutes. In other words, when the monitoring mechanism 83 determines that the pump 240 needs to be deactivated or shut-off, the switch 89 is killed or turned off for the duration of the second predetermined period of time, thus, inhibiting the pump 240 from being activated or turned on either automatically or manually. However, when the second predetermined period of time expires, the switch 89 is turned back on, thus, allowing the pump 240 to be capable of being activated or turned on.

The switch 89 and the second communication device 86 are electrically connected to one another and remotely located from the flowmeter 100 inside a housing 110. The switch 89 is also electrically connected to the power source of the pump 240. Thus, when the switch 89 is in the activated position, then the power source is connected to the pump 240. But, when the switch 89 is in the deactivated position, then the power source is disconnected from the pump 240. In other words, when the switch 89 is activated, then the pump 240 is capable of being powered. On the other hand, when the switch 89 is deactivate, then the pump 240 is disconnected from the power source and is incapable of being powered. In the preferred embodiment of the present invention, the switch 89 is a mechanical relay switch.

The display unit 70 comprises a digital display that is electrically connected to the data manager 82. The display unit 70 is configured to display information related to the flow rate of the water inside the drain pipe 210 with alphanumeric characters. The display unit 70 is encapsulated within a display case 71. The display case 71 has a clear window 72 through which the display unit 70 can be seen, in addition, the display case 71 has a stem 73 through which wires from the display unit 70 to the data manager 82 are passed. The lowermost section of the stem 73 has a plurality of pegs 74 that are attached to a base 75. The attachment of the pegs 74 to the base 75 is such that allows the display case 71 to be angled within a 90 degree range, from an upright vertical position to a downward facing horizontal position. This allows the display unit. 70 to be flipped down when it is unused so as to protected from damage from the sunlight and other elements. Similarly, the display unit 70 can be flipped up to a vertical upright position so that its alphanumeric display can be seen and read by the user when needed.

Figure 2:
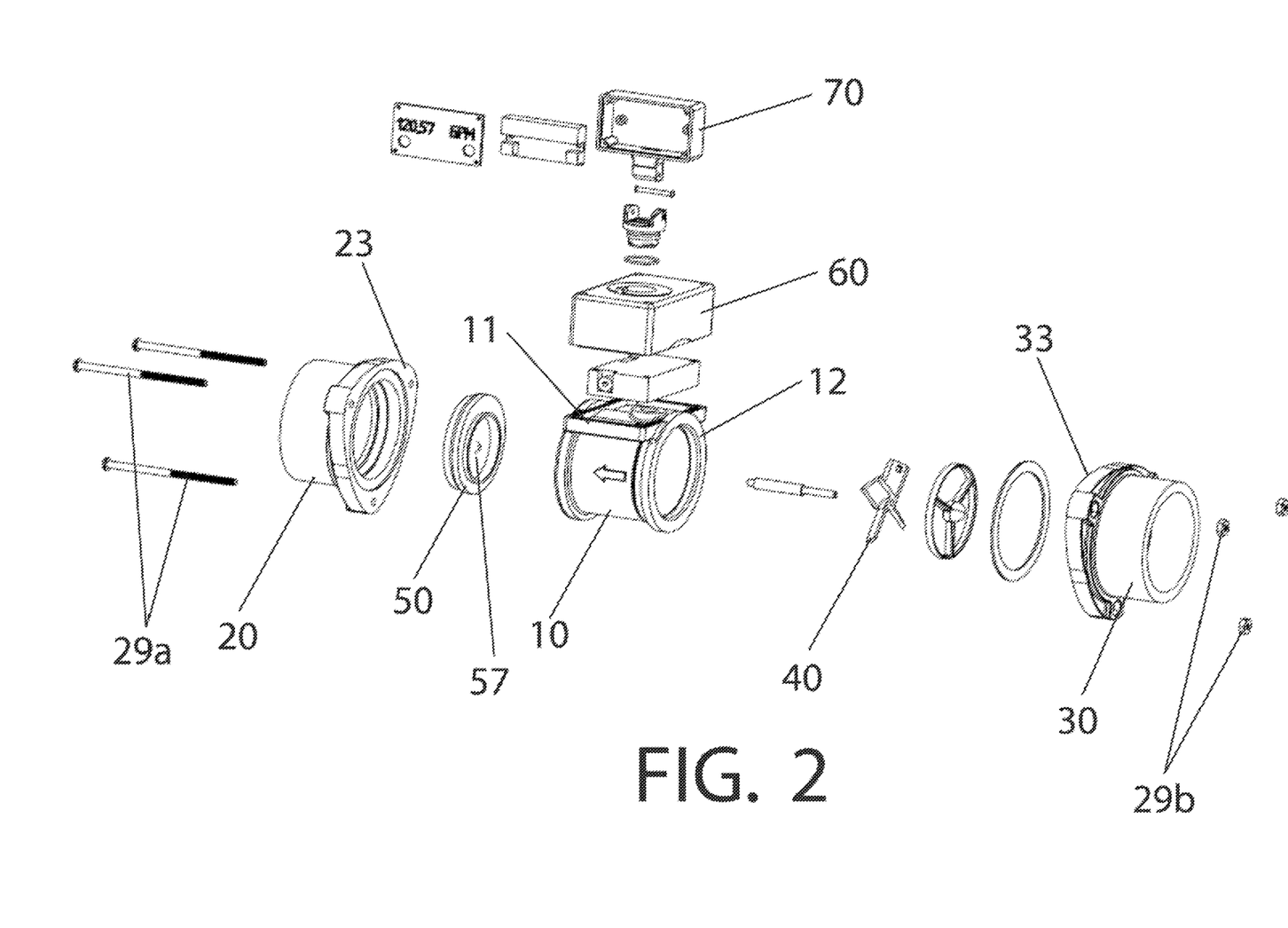
FIG. 2 is an exploded view of the pool flowmeter of the present invention.

The base 75 is rotatably attached to the control box 60, as shown in FIGS. 1 and 2. The rotatable attachment allows the display unit 70 to be rotated relative to the control box 60 so that it can be positioned in the most visible position for the user to read or see it with ease. A stopper 76 protrudes from the control box 60 so as to prevent, the display unit 70 from rotating a full 360 degrees. Allowing the display unit 70 to rotate beyond 360 degrees would promote the entanglement of the wires between the display unit 70 and the data manager 82.

In the preferred embodiment of the present invention, the casing 10 is manufactured out of a clear plastic material. The preferred use of a clear material allows the user visual access to the water flowing within the drain pipe 210.

Although the preferred embodiment utilizes a rotor 40 having blades 45 and that rotates, one ordinarily skilled in the art should realize that other configurations are possible. An alternative embodiment could utilize a pad against which the water flowing through the drain pipe 210 pushes. The pressure from the water flow then displaces said pad. The displacement of said pad is detected by the hall sensor 17 in the same manner that it detects the rotational displacement of the rotor 40 of the preferred embodiment. A second alternative embodiment could utilize a pressure sensing device such as a pilot tube that measures the pressure differential within the drain pipe 210 so that such measurements can be correlated to the flow rate of the water within the drain pipe 210.

It is understood that the described embodiment of the present invention is illustrative only, and that modifications thereof may occur to those skilled in the art. Accordingly, this invention is not to be regarded as limited to the embodiments disclosed, but to be limited only as defined by the appended claims therein.

What is claimed is:

1. A pool flowmeter comprising:
   a casing;
   a front attachment and a back attachment that promote the attachment of said casing to a pipe through which a liquid flows into said casing;
   a rotor within said casing that is displaced by said liquid flow whereby said displacement of said rotor correlates to a flow rate of said liquid;
   a sensor that senses said displacement of said rotor so as to measure said flow rate;
   a switch that deactivates when said flow rate is below a predetermined value for more than a predetermined period of time;
   a flow protector inserted within said front attachment; and
   whereby said flow protector remains normally closed by a spring and opens when said liquid flow overcomes said spring.

2. The pool flowmeter of claim 1 whereby said switch reactivates after a second predetermined period of time has lapsed since said switch deactivated said pump.

3. The pool flowmeter of claim 1 further comprising:
   a data storage unit configured to store predefined preference data;
   a data manager configured to retrieve flow rate data from said sensor and compare said flow rate data with said predefined preference data;
   a first communications device configured to receive a message from said data manager, and to transmit said message to a second communications device that is located remotely from said first communications device when said flow rate is below said predetermined value for more than said predetermined period of time;
   said second communications device configured to receive said message from said first communications device, and to transmit said message to said switch; and
   said message indicating that said switch must deactivate.

4. The pool flowmeter of claim 3 whereas said data manager transmits a second message to said switch via said first and second communications devices after a second predetermined period of time has lapsed since said pump was last deactivated and indicative that said switch must reactivate.

5. The pool flowmeter of claim 1 further comprising:
   a display unit that displays said flow rate.

6. The pool flowmeter of claim 5 whereby said display unit is encased inside a display case that is capable of being angled from an upright vertical position to a downward facing horizontal position.

7. The pool flowmeter of claim 6 whereby said display case is rotatable attached to a control box.

8. The pool flowmeter of claim 1 whereby said casing is made out of a clear material.

* * * * *